US008738682B2

(12) United States Patent  
Dixon et al.

(10) Patent No.: US 8,738,682 B2  
(45) Date of Patent: *May 27, 2014

(54) MONITORING A PATH OF A TRANSACTION ACROSS A COMPOSITE APPLICATION

(71) Applicant: International Business Machines Corporation, Armonk, NY (US)

(72) Inventors: Bret W. Dixon, South Perth (AU); Scot Dixon, South Perth (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/738,939

(22) Filed: Jan. 10, 2013

(65) Prior Publication Data

US 2013/0227121 A1    Aug. 29, 2013

Related U.S. Application Data

(63) Continuation of application No. 13/407,021, filed on Feb. 28, 2012.

(51) Int. Cl.
*G06F 15/16* (2006.01)

(52) U.S. Cl.
USPC .......................................................... 709/201

(58) Field of Classification Search
CPC ..................... H04L 29/08099; H04L 67/025
USPC ................................. 709/201, 202; 348/169
See application file for complete search history.

(56) References Cited

U.S. PATENT DOCUMENTS

| 6,741,968 | B2 * | 5/2004 | Jacoves et al. ............. 705/14.23 |
| 7,653,633 | B2 | 1/2010 | Villella et al. |
| 7,685,143 | B2 | 3/2010 | Tsui et al. |
| 2009/0219811 | A1 | 9/2009 | Dolganow et al. |
| 2011/0099561 | A1 * | 4/2011 | Karakkattillathu Vishnu ........................ 719/320 |

OTHER PUBLICATIONS

ITCAM for WebSphere Application Server: Data Collection and ITCAM for Transactions Integration for Distributed Platforms, V 6.1 Fix Pack 4, International Business Machines Corporation, 2009, 26 pages.
IBM Tivoli Composite Application Manager for Transactions, International Business Machines Corporation, 2009, 6 pages.
Long et al, IMS Primer, International Technical Support Organization. www.redbooks.ibm.com, International Business Machines Corporation, Jan. 2000, 300 pages.

(Continued)

*Primary Examiner* — Frantz Jean
(74) *Attorney, Agent, or Firm* — Jeffrey S. Labaw; Amy J. Pattillo (57) ABSTRACT

At each intermediate transaction hop from among multiple transaction hops in a transaction flow through a composite application, an entry with tracking data for a current transaction hop of the multiple transaction hops is inserted into a tracking envelope associated with the transaction flow and the tracking envelope is passed to a next transaction hop of the transaction hops in the transaction flow. At a final transaction hop of the multiple transaction hops, a final entry with tracking data for the final transaction hop is inserted into the tracking envelope and the multiple entries with tracking data for each of the transaction hops in the tracking envelope are exposed in a single tracking event.

10 Claims, 8 Drawing Sheets

(56) References Cited

OTHER PUBLICATIONS

Daniel Hernandez, IBM Tivoli Composite Application Manager for Transactions Planning and Deployment Best Practices Guide, version 1.3, International Business Machines Corporation, 2010, 57 pages.

U.S. Appl. No. 13/407,021, filed Feb. 28, 2012, in re Dixon, 44 pages.

Office Action, mailing date Sep. 12, 2013, U.S. Appl. No. 13/407,021, filed Feb. 28, 2012, in re Dixon.

Notice of Allowance, mailing date Feb. 5, 2014, U.S. Appl. No. 13/407,021, filed Feb. 28, 2012, in re Dixon, 24 pages.

* cited by examiner

| TRACKING POINT | ENVELOPE CONTENTS | |
|---|---|---|
| WAS OUTBOUND E1 | TRADERIMSWEB/TRADE\|\|TIMESTAMP1 | 402 |
| IMS CONNECT INBOUND E2 | TRADERIMSWEB/TRADE\|\|TIMESTAMP1<br>TRADERBL.HWS03YMO\|\|TIMESTAMP2 | 404 |
| IMS CONNECT OUTBOUND (OTMA) E3 | TRADERIMSWEB/TRADE\|\|TIMESTAMP1<br>TRADERBL.HWS03YMO\|\|TIMESTAMP2<br>TRADERBL.OTMA.REQ\|\|TIMESTAMP3 | 406 |
| IMS CONTROL REGION INBOUND E4 | TRADERIMSWEB/TRADE\|\|TIMESTAMP1<br>TRADERBL.HWS03YMO\|\|TIMESTAMP2<br>TRADERBL.OTMA.REQ\|\|TIMESTAMP3<br>TRADERBL\|\|TIMESTAMP4 | 408 |
| IMS CONTROL REGION OUTBOUND (OTMA) E5 | TRADERIMSWEB/TRADE\|\|TIMESTAMP1<br>TRADERBL.HWS03YMO\|\|TIMESTAMP2<br>TRADERBL.OTMA.REQ\|\|TIMESTAMP3<br>TRADERBL\|\|TIMESTAMP4<br>TRADERBL.OTMA.RESP\|\|TIMESTAMP5 | 410 |
| IMS CONNECT INBOUND E6 | TRADERIMSWEB/TRADE\|\|TIMESTAMP1<br>TRADERBL.HWS03YMO\|\|TIMESTAMP2<br>TRADERBL.OTMA.REQ\|\|TIMESTAMP3<br>TRADERBL\|\|TIMESTAMP4<br>TRADERBL.OTMA.RESP\|\|TIMESTAMP5<br>TRADERBL.HWS03YMO\|\|TIMESTAMP6 | 412 |
| IMS CONNECT OUTBOUND E7 | TRADERIMSWEB/TRADE\|\|TIMESTAMP1<br>TRADERBL.HWS03YMO\|\|TIMESTAMP2<br>TRADERBL.OTMA.REQ\|\|TIMESTAMP3<br>TRADERBL\|\|TIMESTAMP4<br>TRADERBL.OTMA.RESP\|\|TIMESTAMP5<br>TRADERBL.HWS03YMO\|\|TIMESTAMP6<br>TRADERBL.HWS03YMO\|\|TIMESTAMP7 | 414 |
| WAS INBOUND E8 | TRADERIMSWEB/TRADE\|\|TIMESTAMP1<br>TRADERBL.HWS03YMO\|\|TIMESTAMP2<br>TRADERBL.OTMA.REQ\|\|TIMESTAMP3<br>TRADERBL\|\|TIMESTAMP4<br>TRADERBL.OTMA.RESP\|\|TIMESTAMP5<br>TRADERBL.HWS03YMO\|\|TIMESTAMP6<br>TRADERBL.HWS03YMO\|\|TIMESTAMP7<br>TRADERIMSWEB/TRADE\|\|TIMESTAMP8 | 416 |

MONITORING A PATH OF A TRANSACTION ACROSS A COMPOSITE APPLICATION

CROSS REFERENCE TO RELATED APPLICATIONS

This application is a continuation of commonly assigned U.S. patent application Ser. No. 13/407,021, filed Feb. 28, 2012, which is hereby incorporated herein by reference.

TECHNICAL FIELD

The embodiment of the invention relates generally to monitoring a path of a transaction across a composite application in a distributed environment and particularly monitoring a path of a transaction to link multi-system inter-domain transaction activity from end to end across a composite application in a single envelope exposed in a single tracking event.

DESCRIPTION OF THE RELATED ART

Many businesses provide online services that require the business to process multiple concurrent requests, complex requests, or both, in an efficient manner. Online businesses may submit requests to a business application that is tailored to handle each request as one or more transactions that run on the business application to perform a function, such as data research or a purchase. In one example, a composite application represents the multiple distributed components of a business application that run on middleware stacks distributed across one or more operating system platforms and one or more servers in a distributed environment, to efficiently handle purchase requests, data requests, or other requests. Many servers, operating system platforms, middleware stacks, and other components of a distributed environment may include monitoring tools to monitor performance of the operating system platforms or servers within the distributed environment.

BRIEF SUMMARY

In view of the foregoing, there is a need for a method, system, and program product for monitoring a path of a transaction across a composite application in a distributed environment and in particular, for monitoring a path of a transaction to link multi-system inter-domain transaction activity from end to end across a composite application in a single envelope exposed in a single tracking event.

In one embodiment of the invention, a method for tracking a transaction flow in a distributed environment includes, at each intermediate transaction hop from among multiple transaction hops in a transaction flow through a composite application in a distributed computing environment, a computer inserting an entry with tracking data for a current transaction hop of the multiple transaction hops into a tracking envelope associated with the transaction flow and passing the tracking envelope to a next transaction hop of the transaction hops in the transaction flow. The method includes, at a final transaction hop of the multiple transaction hops, the computer inserting a final entry with tracking data for the final transaction hop into the tracking envelope and exposing the multiple entries with tracking data for each of the transaction hops in the tracking envelope in a single tracking event.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
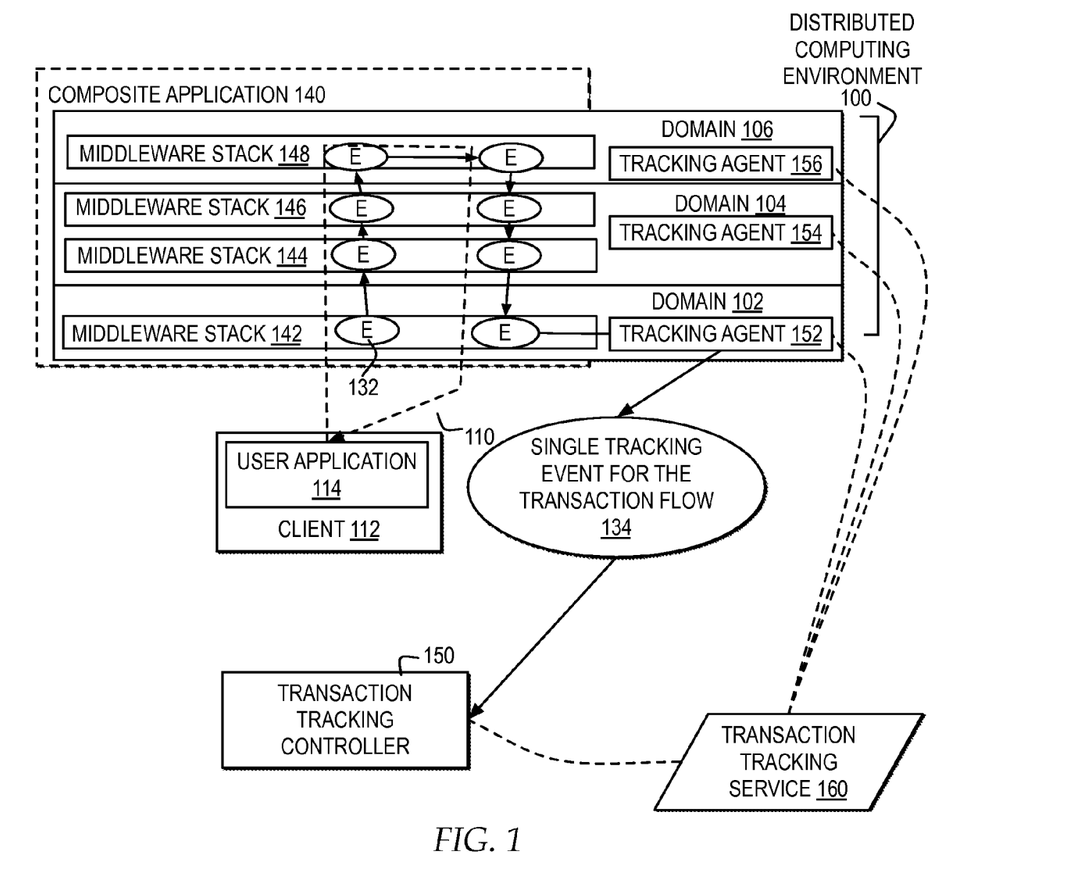
FIG. 1 illustrates a block diagram of a transaction tracking service for monitoring the path of a transaction from end to end across multiple hops of a composite application using a single extending envelope exposed in a single tracking event.

FIG. 1 illustrates a block diagram of a transaction tracking service for monitoring the path of a transaction from end to end across multiple hops of a composite application using a single extending envelope exposed in a single tracking event.

In one example, a distributed computing environment 100 includes one or more distributed hardware resources, one or more distributed software resources, and one or more distributed network resources. In one example, distributed computing environment 100 may include multiple middleware stacks, such as middleware stack 142, middleware stack 144, middleware stack 146, and middleware stack 148, comprising one or more types of middleware and applications distributed across one or more servers (not illustrated) and across one or more operating system platforms (not illustrated). In one example, the middleware and applications distributed in middleware stack 142, middleware stack 144, middleware stack 146, and middleware stack 148, represent software stacks that run in a layer above a network layer, such as in a layer above an open system interconnect (OSI) model network layer seven. While the middleware stacks of distributed computing environment 100 are illustrated at middleware stack 142, middleware stack 144, middleware stack 146, and middleware stack 148, it should be appreciated that distributed computing environment may include additional or alternate middleware stacks.

In one example, one or more composite applications may run in distributed computing environment 100 on the distributed resources. In one example, composite application 140 runs in distributed computing environment 100, where composite application 140 is made up of multiple distributed components that run on middleware stacks 142, 144, 146, and 148 across one or more servers and one or more operating system platforms. A composite application may represent a business application specified for handling one or more types of requests, where a request to the business application from a user application runs, as one or more transactions, on one or more of the multiple middleware stacks. It should be appreciated that composite application 140 may include distributed components that run on additional or alternate middleware stacks of distributed computing environment 100. In addition, it should be appreciated that distributed computing environment 100 may include additional or alternate middleware stacks or instances of middleware stacks that distributed components of composite application 140 do not run on. Moreover, it should be appreciated that multiple composite applications may each include multiple distributed components that run on one or more of the same middleware stacks from among middleware stacks 142, 144, 146, and 148.

A client 112 includes a user application 114. In the example, user application 114 submits one or more requests to composite application 140, where each request is handled as a transaction that flows through the distributed components of composite application 140 and return a result of user application 114. In the example, a transaction request for user application 114, across composite application 140, may flow across multiple middleware stacks, from end to end, as illustrated by transaction flow 110. In the example, transaction flow 110 moves through middleware stack 142, middleware stack 144, middleware stack 146, middleware stack 148, middleware stack 146, middleware stack 144, and middleware stack 142. In one example, user application 114 represents software that runs in a layer above a network application layer, such as in a layer above network application layer OSI-7. Although a single client implementing a single user application is illustrated, it should be appreciated that client 112 may include multiple user applications submitting requests to composite application 140 and that multiple clients, each running an instance of user application 144, may submit requests to composite application 140.

Distributed component environment 100 includes one or more components of a transaction tracking service 160 for tracking a path of each transaction across composite application 140. In the example, transaction tracking service 160 includes one or more tracking agents, illustrated as a tracking agent 152, a tracking agent 154, and a tracking agent 156, each configured to monitor the transactions within a separate domain of distributed computing environment 100. In particular, tracking agent 152, tracking agent 154, and tracking agent 156 are configured to monitor transaction activity at strategic points in transaction flow 110. In addition, transaction tracking server 160 includes a transaction tracking controller 150 for reading tracking events generated by tracking agents and analyzing the tracking data exposed by the tracking agents. In one example, transaction tracking service 160 is implemented using IBM® Tivoli® Composite Application Manager (ITCAM), which is employed to follow the path of a transaction from end to end across a composite application. It should be appreciated that transaction tracking service 160 may include additional or alternate components depending on the types of distributed resources, regional positioning of the distributed resources, and other characteristics of the distributed resources of distributed computing environment 100.

Each of tracking agent 152, tracking agent 154, and tracking agent 156 are each configured to monitor transaction activity, at one or more tracking points, within one or more specific middleware stack instances, where each specified selection of middleware stack instances tracked is referred to as a domain. Tracking agent 152, tracking agent 154, and tracking agent 156 are configured to pass a tracking envelope within each domain and between adjacent domains. In the example, tracking agent 152 is configured to monitor the group of resources including middleware stack 142, where the tracked group of middleware stack resources is referred to as a domain 102, tracking agent 154 is configured to monitor the group of resources including middleware stack 144 and middleware stack 146, where the tracked group of middleware stack resources is referred to as a domain 104, and tracking agent 156 is configured to monitor the group of resources including middleware stack 148, where the tracked group of middleware stack resources is referred to as a domain 106. In the example, each of tracking agent 152, tracking agent 154, and tracking agent 156 may run within one or more of the servers hosting each of middleware stack 142, middleware stack 144, middleware stack 146, and middleware stack 148 or may run within one or more servers separate from the servers hosting each of middleware stack 142, middleware stack 144, middleware stack 146, and middleware stack 148. Although each tracking agent in FIG. 1 is illustrated as monitoring resources in a single domain, each of tracking agent 152, tracking agent 154, and tracking agent 156 may also be configured to monitor resources in multiple multiple domains.

Each of tracking agent 152, tracking agent 154, and tracking agent 156 monitors transaction activity along transaction flow 110 at one or more hops within composite application 140, described herein as hops or tracking points. In one example, the transaction activity identified is tracking data, including, but not limited to, context and metrics for the particular transaction. Context data provides information for identifying a portion of a network topology of composite application 140 along the path of a transaction flow at the tracking point. Metrics data provides information for identifying a time stamp at the tracking point for the transaction flow. In addition, tracking data may include additional or alternate data collectable by tracking agents describing characteristics of a particular transaction through a composite application, about a particular layer of the composite application, or about other layers of the distributed environment interacted with by a transaction.

In the example, a tracking agent, for a domain in which a transaction flow originates, dynamically generates an extending envelope for each new transaction flow detected. In the example, tracking agent 152 tracks the flow of transactions through one or more tracking points in domain 102, the domain originating transaction flow 110. Tracking agent 152 dynamically generates an extending tracking envelope for a new transaction flow, illustrated as extending tracking envelope (E) 132, and associates tracking envelope 132 with transaction flow 110. Tracking envelope 132 is a data structure specified to expand as data is inserted in tracking envelope 132 at multiple tracking points, such as a data structure specified for token insertion at multiple points, expanding with the insertion of each token. In one example, tracking agent 152 may determine the domain in which a transaction flow originates by detecting an empty envelope or from detecting a setting indicating the current domain is an originating domain.

Each of tracking agent 152, tracking agent 154, and tracking agent 156 reports the tracking data from each tracking point monitored by the tracking agent by inserting an entry for the tracking data into a tracking envelope and passing the tracking envelope to the next tracking point along transaction flow 110. When the tracking envelope reaches a tracking point in a domain in which the transaction flow 110 terminates, the tracking envelope is composed of tracking data entries from multiple tracking points along transaction flow 110, ordered to reflect the order of the tracking points identified along transaction flow 110. In particular, each of tracking agent 152, tracking agent 154, and tracking agent 156 are configured to open tracking envelope 132, insert an additional entry into tracking envelope 132, expanding the envelope, and pass tracking envelope 132 to a next tracking point. In particular, tracking envelope 132 is a data structure that is passed by tracking agents from one tracking point to a next tracking point in the domains along transaction path 110. Tracking agents may pass tracking envelope 132 to a next tracking point in a same domain, to associate intra-domain transaction activity, and to a next tracking point in another domain, to associate inter-domain transaction activity.

In the example, tracking agent 152 dynamically generates tracking envelope 132, inserts tracking data for transaction flow 110 through a first tracking point in middleware stack 142 into tracking envelope 132, and passes tracking envelope 132 to domain 104. Tracking agent 154 detects tracking data for transaction flow 110 through a next tracking point in middleware stack 144, inserts the tracking data in tracking envelope 132, and passes tracking envelope 132 to domain 104. Tracking agent 154 detects tracking data for transaction flow 110 through a next tracking point in middleware stack 146, inserts the tracking data in tracking envelope 132, and passes tracking envelope 132 to domain 106. Tracking agent 156 detects tracking data for transaction flow 110 through a next tracking point in middleware stack 148, inserts the tracking data in tracking envelope 132, and passes tracking envelope 132 to domain 106. Tracking agent 156 detects tracking data for transaction flow 110 through a next tracking point in middleware stack 148, inserts the tracking data in tracking envelope 132, and passes tracking envelope 132 to domain 104. Tracking agent 154 detects tracking data for transaction flow 110 through a next tracking point in middleware stack 146, inserts the tracking data in tracking envelope 132, and passes tracking envelope 132 to domain 104. Tracking agent 154 detects tracking data for transaction flow 110 through a next tracking point in middleware stack 144, inserts the tracking data in tracking envelope 132, and passes tracking envelope 132 to domain 102. Tracking agent 152 detects tracking data for transaction flow 110 through a next tracking point in middleware stack 142, inserts the tracking data in tracking envelope 132, and detects that domain 102 is the domain in which transaction flow 110 terminates.

In the example, the tracking agent for a domain in which transaction flow 110 terminates, illustrated in the example as tracking agent 152 in terminating domain 102, exposes the multiple tracking data entries in the tracking envelope in a single tracking event for the transaction flow, as illustrated at reference numeral 134. In the example, in the terminating domain, tracking envelope 132 includes tracking data identifying the path of the transaction across composite application 140 from end-to-end, inserted into tracking envelope 132 in real-time. No tracking events need to be exposed at any of the intermediate tracking points prior to the domain in which transaction flow 110 terminates. In one example, tracking agent 152 may determine that the tracking agent is in a domain in which transaction flow 110 terminates from detecting a setting indicating the current domain is the terminating domain or from inspecting the contents of the tracking envelope and identifying that the current domain is also the originating domain for a transaction flow.

Transaction tracking controller 150 detects the single tracking event illustrated at reference numeral 134 and analyzes the tracking data entries reported in the single tracking event for a transaction flow to construct an entire transaction path topology across composite application 140, with timing along the path. Transaction tracking controller 150 may perform response time analysis for each component of a composite application for each transaction flow from the constructed transaction path topology with timing along the path.

While transaction tracking service 160 provides a service for tracking multiple transaction flows across one or more middleware stacks of a composite application, to enable a user to monitor the path and timing of each transaction, so that a user may identify where a particular transaction is delayed or where an error occurs in a transaction that flows across multiple tracked domains across a composite application, transaction tracking service 160 increases processor overhead and network traffic to function. In one embodiment, inserting tracking data for a transaction into a single tracking envelope at each tracking point in a transaction flow and exposing the envelope in a single tracking event at the end of the transaction flow requires minimal processor overhead and imposes minimal network traffic for a user to receive an end result of a transaction path topology and timing metrics. In particular, while transaction flow 110 runs through a software layer operating above a network application layer, the tracking event generated for transaction flow 110 still pushes through the network application layer, and other functional layers, when exposed to the transaction tracking controller. Reducing the number of tracking events required to expose tracking data for a transaction flow across multiple domains, to a single tracking event in a layer above the network stack layers, also minimizes the number of events required to be passed through network layers, minimizing the processor overhead and network traffic at each OSI layer required to pass the tracking event across a network to the transaction tracking controller. Further, by tracking the path of a transaction and path timing for a transaction flowing across multiple tracked domains across a composite application, transaction tracking services 160 tracks information about the path of the transaction flowing through a composite application, above a network application layer, separate from any monitoring tools for monitoring the performance of an underlying network application in a network application layer.

While each of tracking agent 152, tracking agent 154, and tracking agent 156 may be configured to expose tracking data in tracking events, by gathering tracking data entries from each tracking point in real-time in a single tracking envelope and exposing the tracking data entries from the tracking envelope in a single tracking event in the terminating domain, in the example, the multi-system, inter-domain transaction activity of a transaction flow through domain 102, domain 104, and domain 106 is collected in a single tracking envelope and exposed in a single tracking event, on a single domain. Since each tracking event placed on the network causes network traffic, using only a single tracking event to pass multiple tracking data entries collected along a transaction path is an efficient cause of network traffic. While each tracking agent may invoke one or more handles or processes to pass a tracking envelope to a next domain along a transaction flow, by tracking inter-domain transaction activity for a transaction flow by passing a tracking envelope with the tracking data associated with each domain, from domain to domain along a transaction flow, the ordering of the tracking data entries in the envelope alone is required to identify the inter-domain transaction activity, providing a simple method for tracking inter-domain transaction activity.

In the example, tracking envelope 132 may represent an expandable data structure that is passed between domains in a manner similar to how a correlator is passed between tracking points in different domains to associate inter-domain interactions. A static correlator, for example, represents transaction identification data generated in a source domain in a transaction flow and passed to a target domain in a transaction flow, to be associated by tracking agents at each of the domains with tracking data collected at each of the target domain and source domain. In the example illustrated in FIG. 1, if the tracking agents implement a correlator, rather than a tracking envelope, each tracking agent would then be required to expose the tracking data at each tracking point, with associated transaction identification data from the correlator, and transaction tracking controller 150 would then be required to read a separate tracking event for each tracking point and correlate and order tracking events, and inter-domain transaction activity, based on the correlator data reported in each tracking event with the tracking data. In a distributed environment where correlators or other similar domain association structures are already passed between domains to associate inter-domain transaction activity, an extending tracking envelope may be passed, in place of the correlator, and the tracking agents set to only generate a tracking event at the terminating domain, to reduce the number of tracking events created during a transaction flow down to a single tracking event, and to eliminate the need for transaction tracking controller 150 to first associate and order multiple tracking data, while still monitoring tracking data for a transaction in real-time. In particular, in the example illustrated in FIG. 1, if a correlator were used, in lieu of a tracking envelope, and a tracking event were exposed at each tracking point with the tracking data and correlator, the tracking agents would generate eight tracking events, network traffic would include eight tracking events, and transaction tracking controller 150 would handle receipt of and ordering of eight tracking events. In contrast, in the example illustrated in FIG. 1, where tracking envelope 132 is passed between tracking points with tracking data inserted into tracking envelope 132 in real-time and tracking envelope 132 exposed in a single tracking event at the end of transaction flow 110, only tracking agent 152 generates a single tracking event, network tracking includes one tracking event, and transaction tracking controller 150 handles receipt of a tracking event with tracking data entries already ordered to reflect their order in the transaction flow, indicating multi-system inter-domain transaction activity.

In the example, while the tracking data for transaction flow 110 is collected in tracking envelope 132 and exposed in a single tracking event, in the case that tracking data is inserted into tracking envelope 132 that expands tracking envelope 132 to a size that exceeds a size threshold, a tracking agent may expose the tracking data entries currently within tracking envelope 132 in one tracking event prior to the end of the transaction flow, empty tracking envelope 132, insert the remaining tracking data entries within tracking envelope 132, and expose the remaining tracking data entries in a next tracking event prior to the end of the transaction flow, if the size of tracking envelope 132 exceeds a size threshold again, or at the end of the transaction flow. In one example, while reducing the amount of network traffic from tracking events may improve the efficiency and reduce the load from transaction tracking service 160, if the tracking events exceed the threshold size for optimal performance on a network, additional computational time may be added to handle tracking events exceeding the threshold size unless the envelope is exposed in multiple tracking events at different points. In the example where a tracking envelope is exposed in tracking events multiple times during a transaction flow and then emptied, a count may be maintained with the tracking envelope each time the tracking envelope is emptied, and the count may be passed in the tracking event, to designate the order of each tracking entry for the transaction tracking controller 150.

Figure 2:
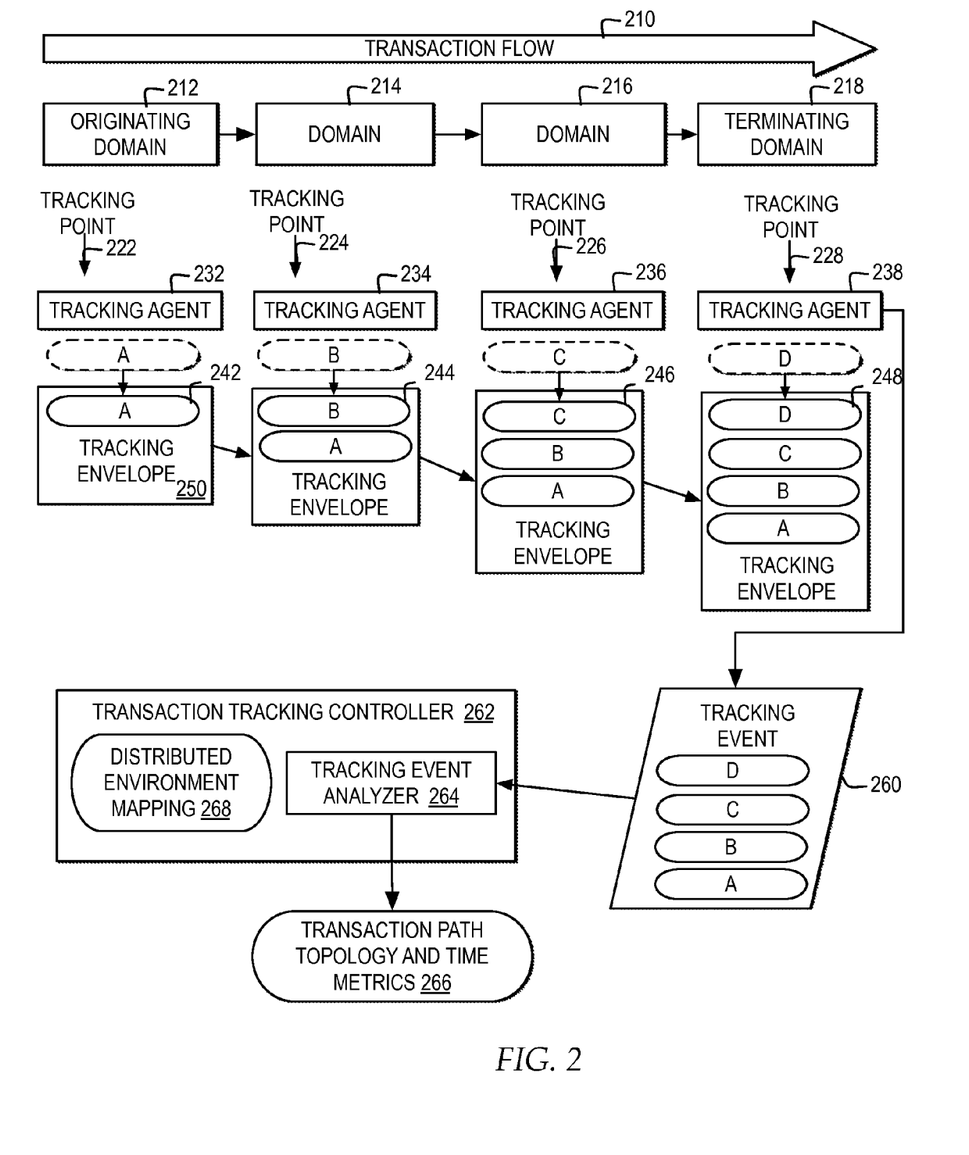
FIG. 2 illustrates a block diagram of one example of an tracking envelope expanded at each tracking point of a transaction flow across a composite application.

With reference now to FIG. 2, a block diagram illustrates one example of an tracking envelope expanded at each tracking point of a transaction flow across a composite application. In the example, a transaction flow 210 represents the directional flow of a transaction across a composite application or other grouping of distributed components upon which a transaction runs, monitored within multiple domains, where each domain represents a selection of middleware stack resources monitored by a separate tracking agent configured to monitor one or more tracking points within the domain within the selection of middleware stack resources. In the example, an originating domain 212, in which transaction flow 210 originates, is monitored by tracking agent 232. Tracking agent 232, as the originating tracking agent for transaction flow 210, dynamically generates a tracking envelope 250 and associates tracking envelope 250 with transaction flow 210. Tracking agent 232 monitors tracking data A for transaction flow 210 at tracking point 222 in originating domain 212, inserts tracking data A into tracking envelope 250, as illustrated at reference numeral 242, and passes tracking envelope 250 to a next tracking point 224. Tracking agent 234 monitors tracking data B for transaction flow 210 at tracking point 224 in domain 214, inserts tracking data B into tracking envelope 250, as illustrated at reference numeral 244, and passes tracking envelope 250 to a next tracking point 226. Tracking agent 236 monitors tracking data C for transaction flow 210 at tracking point 226 in domain 216, inserts tracking data C into tracking envelope 250, as illustrated at reference numeral 246, and passes tracking envelope 250 to a next tracking point 228. Tracking agent 238 monitors tracking data D for transaction flow 210 at tracking point 228 in terminating domain 218, inserts tracking data D into tracking envelope 250, as illustrated at reference numeral 248, and detects that the domain is the terminating domain. In the example, tracking points 222, 224, and 226 represent intermediate tracking points or hops and tracking point 228 is a final tracking point or hop, for transaction flow 210.

As illustrated, tracking envelope 250 has been expanded, at tracking point 228, to include multiple entries for tracking data A, tracking data B, tracking data C, and tracking data D, ordered to reflect the order of entry along transaction flow 210. Tracking agent 238 exposes the multiple entries in tracking envelope 250 in a single tracking event, illustrated as tracking event 260. A transaction tracking controller 262 reads tracking event 260 and a tracking event analyzer 264 analyzes tracking event 260 and identifies a transaction path topology and time metrics 266 from the multiple tracking data entries in the single tracking event. In particular, tracking data A, tracking data B, tracking data C, and tracking data D provides context for the actual path taken by transaction flow 210 at each tracking point and provides time stamps from calculating the time metrics for each section of the path of transaction flow 210.

In addition, while tracking envelope 250 includes structured data describing all the intermediate transaction hops for transaction flow 210, and the associated timing data, to enable tracking event analyzer 264 to construct the entire transaction path topology and timing data, transaction tracking controller 262 may also include a distributed environment mapping 268 that includes topology and architecture information about distributed environment 100. Tracking event analyzer 264 may analyze tracking event 260 in view of information in distributed environment mapping 268 to create or supplement topological aspects of the transaction path for a transaction exposed in tracking event 260.

Figure 3:
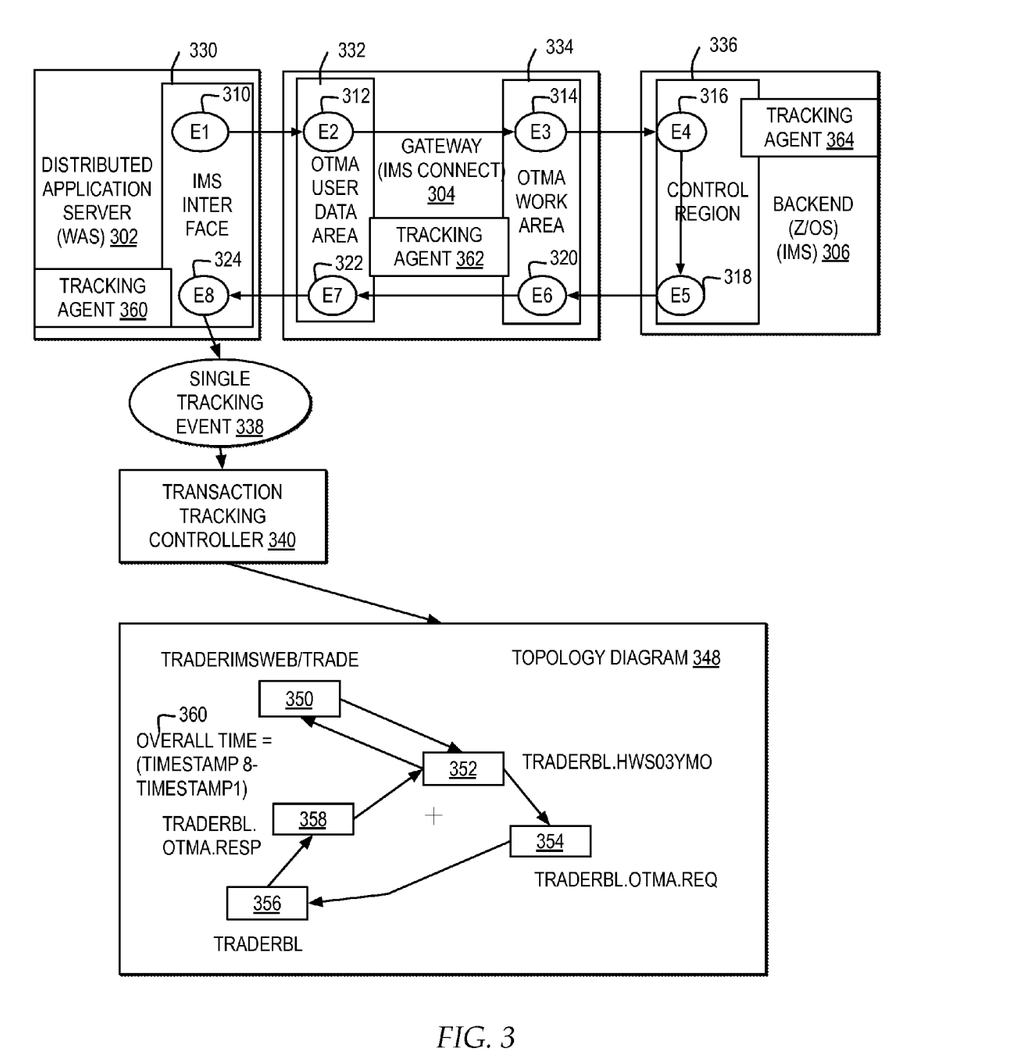
FIG. 3 illustrates a block diagram of an example of a distributed computing environment including a distributed application server, gateway, and backend server, representing distributed components of a composite application, across which an end to end transaction is monitored.

With reference now to FIG. 3, a block diagram illustrates an example of a distributed computing environment including a distributed application server, gateway, and backend server, representing distributed components of a composite application, across which an end to end transaction is monitored. In the example, a distributed computing environment 300 is illustrated in a high level system view depicting a distributed application server 302, such as a web application server (WAS) running one or more instances of a WAS middleware stack, connected via a network to a gateway 304, such as an Information Management System (IMS®) CONNECT system running one or more instances of an IMS CONNECT middleware stack, connected to a backend 306, such as a z/OS® backend running one or more instances of an IMS middleware stack. In the example, a tracking agent 360 is configured to track a first domain, tracking transaction flows through one or more instances of a WAS middleware stack across distributed application server 302, a tracking agent 362 is configured to track a second domain, tracking transaction flows through one or more instances of an IMS connect middleware stack across gateway 304, and a tracking agent 364 is configured to track a third domain, tracking transaction flows through one or more instances of an IMS middleware stack across backend 306, where one or more tracking agents are configured and running to track transaction flows through multiple tracking points in each domain. In the example, an extendible tracking envelope is generated at a tracking point 310, and following a transaction flow through distributed computing environment 300, the extending envelope is populated with tracking data, including context for the transaction and timing data, by tracking agent 360 at each of tracking points 310 and 324, by tracking agent 362 at each of tracking points 312, 314, 320, and 322, and by tracking agent 364 at each of tracking points 316 and 318. For example, tracking agents supported by IBM® Tivoli® Composite Application Manager (ITCAM) for Transactions may be configured in each domain for monitoring transactions flowing through each domain and for support intra-domain tracking interaction and inter-domain tracking interaction for passing the tracking envelope following the transaction flow.

Figure 4:
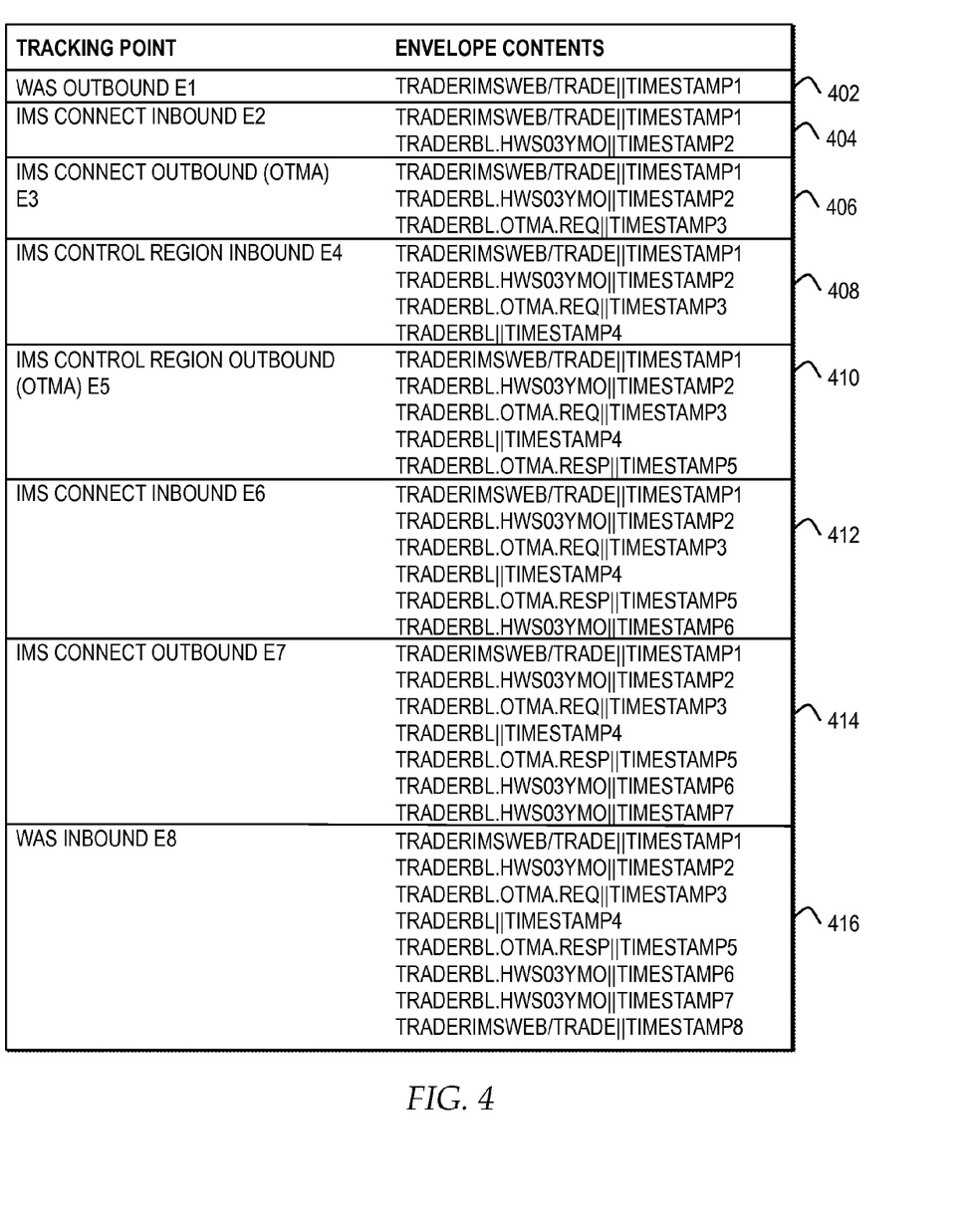
FIG. 4 illustrates a block diagram of one example of the tracking data inserted into a tracking envelope passed between tracking points of a transaction flow across a composite application.

With reference now to FIG. 4, FIG. 4 illustrates one example of the contents inserted into the tracking envelope at tracking points 310, 312, 314, 316, 318, 320, 322, and 324. At each of the tracking points, the context data inserted into the tracking envelope identifies a component of a composite application distributed across distributed application server 302, gateway 304, and backend 306, called during a transaction flow. In the example, each of tracking points 310, 312, 314, 316, 318, 320, and 322 are intermediate tracking points, or hops, and tracking point 324 is a final tracking point, or final hop, in the transaction flow.

In the example, entry 402 indicates the contents of the tracking envelope at tracking point 310. In the example, the transaction flows from a first domain tracked across distributed application server 302 by tracking agent 360, to a next domain, tracked across gateway 304 by tracking agent 362, through an IMS interface 330 of distributed application server 302. At tracking point 310, identified as "WAS OUTBOUND E1" in entry 402, the context for the transaction through the composite application identifies that the transaction flows through "TRADERIMSWEB/TRADE" and the time metric is a "timestamp 1". In one example, "TRADERIMSWEB" identifies the direct front end for the trader IMS® for one or more purposes, and, for example, to validate that the trader IMS application is running before the transaction flows to the IMS® Connect system.

In the example, entry 404 indicates the contents of the tracking envelope at tracking point 312. In the example, the transaction flows into the second domain tracked across by gateway 304 by tracking agent 362 through an OTMA user data area 332. At tracking point 312, identified as "IMS CONNECT INBOUND E2" in entry 404, tracking agent 362 receives the tracking envelope, opens the tracking envelope, and inserts context for the inbound IMS connect request, identifying the transaction flow through "TRADERBL.HWS03YMO" and a timestamp of "timestamp 2". In the example, "TRADERBL.HWS03YMO" identifies the particular IMS® Connect gateway, at which an inbound request was received, for tracking the flow of the transaction through gateway 304.

In the example, entry 406 indicates the contents of the tracking envelope at tracking point 314. In the example, the transaction flows into an OTMA work area 334. At tracking point 312, identified as "IMS CONNECT OUTBOUND E3" in entry 406, tracking agent 362 receives the tracking envelope, opens the tracking envelope, and inserts context for the outbound IMS® connect, identifying the transaction flow through "TRADERBL.OTMA.REQ" and a timestamp of "timestamp 3". In the example, "TRADERBL.OTMA.REQ" identifies the transaction flow through a particular Open Transaction Manager Access (OTMA) message request identifying an OTMA client to an IMS® in OTMA work area 334.

In the example, entry 408 indicates the contents of the tracking envelope at tracking point 316. In the example, the transaction flows from the second domain tracked across gateway 304 by tracking agent 362 into the third domain tracked by tracking agent 364 across backend 306, at tracking points within a control region 336. At tracking point 316, identified as "IMS CONTROL REGION INBOUND E4" in entry 408, the tracking agent 364 receives the tracking envelope, opens the tracking envelope, and inserts context for the inbound IMS® control region, identifying the transaction flow through "TRADERBL" and a timestamp of "timestamp 4". In one example, IMS, within backend 306, is implemented in a single transaction identified by "TRADERBL".

In the example, entry 410 indicates the contents of the tracking envelope at tracking point 318. In the example, the transaction flows back through the third domain tracked by tracking agent 364, outbound from control region 336. At tracking point 318, identified as "IMS CONTROL REGION OUTBOUND E5" in entry 410, tracking agent 364 receives the tracking envelope, opens the tracking envelope, and inserts context for the outbound IMS® control region, identifying the transaction flow through "TRADERBL.OTMA-.RESP" and a timestamp of "timestamp 5". In the example, "TRADERBL.OTMA.RESP" identifies the transaction flow through a particular OTMA work area 334, for a call to an OTMA message response back to the requesting OTMA client.

In the example, entry 412 indicates the contents of the tracking envelope at tracking point 320. In the example, the transaction flows from the third domain tracked by tracking agent 364 back to the second domain tracked by tracking agent 362. At tracking point 320, identified as "IMS CONNECT INBOUND E6" in entry 412, tracking agent 362 receives the tracking envelope, opens the tracking envelope, and inserts context for the inbound IMS® connect, identifying the transaction flow through "TRADERBL.HWS03YMO" and a timestamp of "timestamp 6". In the example, "TRADERBL.HWS03YMO" identifies the particular IMS® Connect gateway, at which an inbound request was received, for tracking the flow of the transaction back through gateway 304.

In the example, entry 414 indicates the contents of the tracking envelope at tracking point 322. In the example, the transaction flows within the second domain tracked by tracking agent 362, to OTMA user data area 332. At tracking point 322, identified as "IMS CONNECT OUTBOUND E7" in entry 414, tracking agent 362 receives the tracking envelope, opens the tracking envelope, and inserts context for the outbound IMS connect, identifying the transaction flow through "TRADERBL.HWS03YMO" and a timestamp of "timestamp 7". In the example, "TRADERBL.HWS03YMO" identifies the particular IMS® Connect gateway, at which an outbound request was received, for tracking the flow of the transaction back through gateway 304.

In the example, entry 416 indicates the contents of the tracking envelope at tracking point 322. In the example, the transaction flows from the second domain tracked by tracking agent 362 back to the first domain tracked by tracking agent 360. At tracking point 322 in IMS interface 330, identified as "WAS INBOUND E8" in entry 414, tracking agent 360 receives the tracking envelope, opens the tracking envelope, and inserts context for the inbound WAS, identifying the transaction flow through "TRADERIMSWEB/TRADE" and a timestamp of "timestamp 8".

In FIG. 3, at the end point of the transaction, at tracking point 324, tracking agent 360 exposes the tracking envelope in a single tracking event 338. A transaction tracking controller 340 detects single tracking event 330 and reads the tracking data collected in the tracking envelope, illustrated as entry 416 in FIG. 4. Transaction tracking controller 340 analyzes each tracking data entry, including context data and timestamps, exposed in single tracking event 330 and generates a topology diagram 348 illustrating the topology of the path of the transaction as tracked in the tracking envelope. In particular, the tracking data collected in the tracking envelope, as illustrated in entry 416, includes structured data describing the intermediate transaction hops and associated timing data to enable transaction tracking controller to construct the entire transaction topology for the transaction flow and all the timing data along the transaction path across a composite application.

In the example, topology diagram 348 reflects the tracking data entries from contents 416 in FIG. 4, analyzed by transaction tracking controller 340 to identify a path of the transaction flow through a composite application. In the example, based on the context data provided at each tracking point, as inserted into the tracking envelope, five components called for the composite application are identified, including "TRADERIMSWEB/TRADE", identified by component 350, "TRADERBLHWS03TMO", identified by component 352, "TRADERBL.OTMA/REQ", identified by component 354, "TRADERBL", identified by component 356, AND TRADERBL.OTMA.RESP", identified by component 358. In addition, in the example, based on the context data provided at each tracking point, a path of the transaction flow across the middleware stack components of a composite application is identified, starting at component 350, passing to component 352, passing to component 354, passing to component 356, passing to component 358, passing to component 352, and returning to component 350. In the example, an overall time is illustrated at reference numeral 360, with a time equal to "TIMESTAMP 8" less "TIMESTAMP 1", as recorded in contents 416. In another example, topology diagram 348 may include a time taken to move from one hop to a next hop. For example, a time taken to move from tracking point 310 to tracking point 312 may be calculated from "TIMESTAMP 2", recorded at tracking point 312, less "TIMESTAMP 1", recorded at tracking point 310.

In particular, in the example, while the tracking points are identified by inbound and outbound control areas of each domain in which tracking points occur, the context data gathered for each tracking point identifies the actual path of a transaction through a composite application, and a time taken for each section of a path taken by a transaction.

Figure 5:
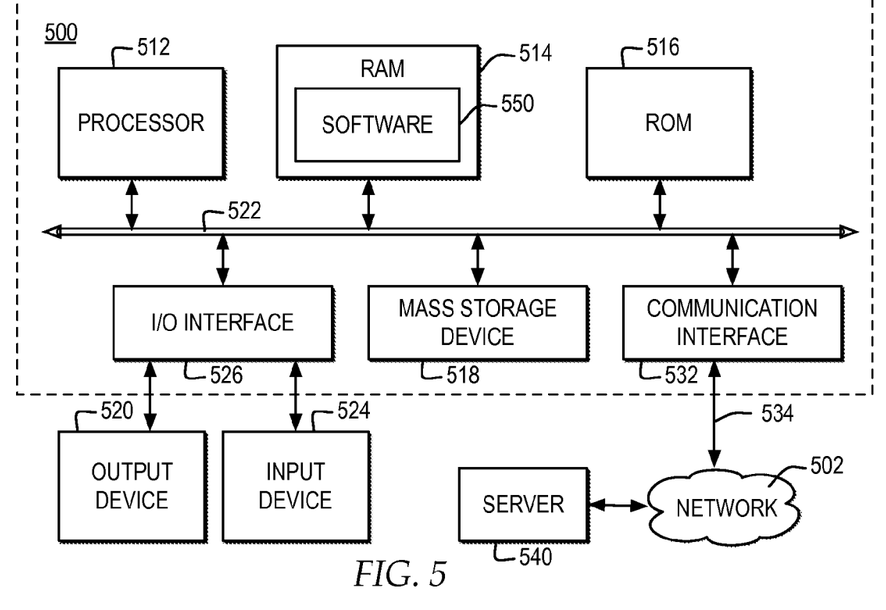
FIG. 5 illustrates a block diagram of one example of a computer system in which one embodiment of the invention may be implemented.

FIG. 5 illustrates one example of a computer system in which one embodiment of the invention may be implemented. The present invention may be performed in a variety of systems and combinations of systems, made up of functional components, such as the functional components described with reference to computer system 500 and may be communicatively connected to a network, such as network 502.

Computer system 500 includes a bus 522 or other communication device for communicating information within computer system 500, and at least one hardware processing device, such as processor 512, coupled to bus 522 for processing information. Bus 522 preferably includes low-latency and higher latency paths that are connected by bridges and adapters and controlled within computer system 500 by multiple bus controllers. When implemented as a server or node, computer system 500 may include multiple processors designed to improve network servicing power. Where multiple processors share bus 522, additional controllers (not depicted) for managing bus access and locks may be implemented.

Processor 512 may be at least one general-purpose processor such as IBM® PowerPC® processor that, during normal operation, processes data under the control of software 550, which may include at least one of application software, an operating system, middleware, and other code and computer executable programs accessible from a dynamic storage device such as random access memory (RAM) 514, a static storage device such as Read Only Memory (ROM) 516, a data storage device, such as mass storage device 518, or other data storage medium. Software 550 may include, but is not limited to, code, applications, protocols, interfaces, and processes for controlling one or more systems within a network including, but not limited to, an adapter, a switch, a server, a cluster system, and a grid environment.

In one embodiment, the operations performed by processor 512 may control the operations of flowchart of FIGS. 6-9 and other operations described herein. Operations performed by processor 512 may be requested by software 550 or other code or the steps of one embodiment of the invention might be performed by specific hardware components that contain hardwired logic for performing the steps, or by any combination of programmed computer components and custom hardware components.

Those of ordinary skill in the art will appreciate that aspects of one embodiment of the invention may be embodied as a system, method or computer program product. Accordingly, aspects of one embodiment of the invention may take the form of an entirely hardware embodiment, an entirely software embodiment (including firmware, resident software, microcode, etc.) or an embodiment containing software and hardware aspects that may all generally be referred to herein as "circuit," "module," or "system." Furthermore, aspects of one embodiment of the invention may take the form of a computer program product embodied in one or more tangible computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, such as mass storage device 518, a random access memory (RAM), such as RAM 514, a read-only memory (ROM) 516, an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction executing system, apparatus, or device.

A computer readable signal medium may include a propagated data signal with the computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction executable system, apparatus, or device.

Program code embodied on a computer readable medium may be transmitted using any appropriate medium, including but not limited to, wireless, wireline, optical fiber cable, radio frequency (RF), etc., or any suitable combination of the foregoing.

Computer program code for carrying out operations of on embodiment of the invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, such as computer system 500, partly on the user's computer, as a stand-alone software package, partly on the user's computer and partly on a remote computer or entirely on the remote computer or server, such as server 540. In the latter scenario, the remote computer may be connected to the user's computer through any type of network, such as network 502, through a communication interface, such as network interface 532, over a network link that may be connected, for example, to network 502.

In the example, network interface 532 includes an adapter 534 for connecting computer system 500 to network 502 through a link and for communicatively connecting computer system 500 to server 540 or other computing systems via network 502. Although not depicted, network interface 532 may include additional software, such as device drivers, additional hardware and other controllers that enable communication. When implemented as a server, computer system 500 may include multiple communication interfaces accessible via multiple peripheral component interconnect (PCI) bus bridges connected to an input/output controller, for example. In this manner, computer system 500 allows connections to multiple clients via multiple separate ports and each port may also support multiple connections to multiple clients.

One embodiment of the invention is described below with reference to flowchart illustrations and/or block diagrams of methods, apparatus (systems) and computer program products according to embodiments of the invention. Those of ordinary skill in the art will appreciate that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, such as computer system 500, or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, such as computer system 500, or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Network interface 532, the network link to network 502, and network 502 may use electrical, electromagnetic, or optical signals that carry digital data streams. The signals through the various networks and the signals on network 502, the network link to network 502, and network interface 532 which carry the digital data to and from computer system 500, may be forms of carrier waves transporting the information.

In addition, computer system 500 may include multiple peripheral components that facilitate input and output. These peripheral components are connected to multiple controllers, adapters, and expansion slots, such as input/output (I/O) interface 526, coupled to one of the multiple levels of bus 522. For example, input device 524 may include, for example, a microphone, a video capture device, an image scanning system, a keyboard, a mouse, or other input peripheral device, communicatively enabled on bus 522 via I/O interface 526 controlling inputs. In addition, for example, output device 520 communicatively enabled on bus 522 via I/O interface 526 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 5 may vary. Furthermore, those of ordinary skill in the art will appreciate that the depicted example is not meant to imply architectural limitations with respect to the present invention.

Figures 6, 7:
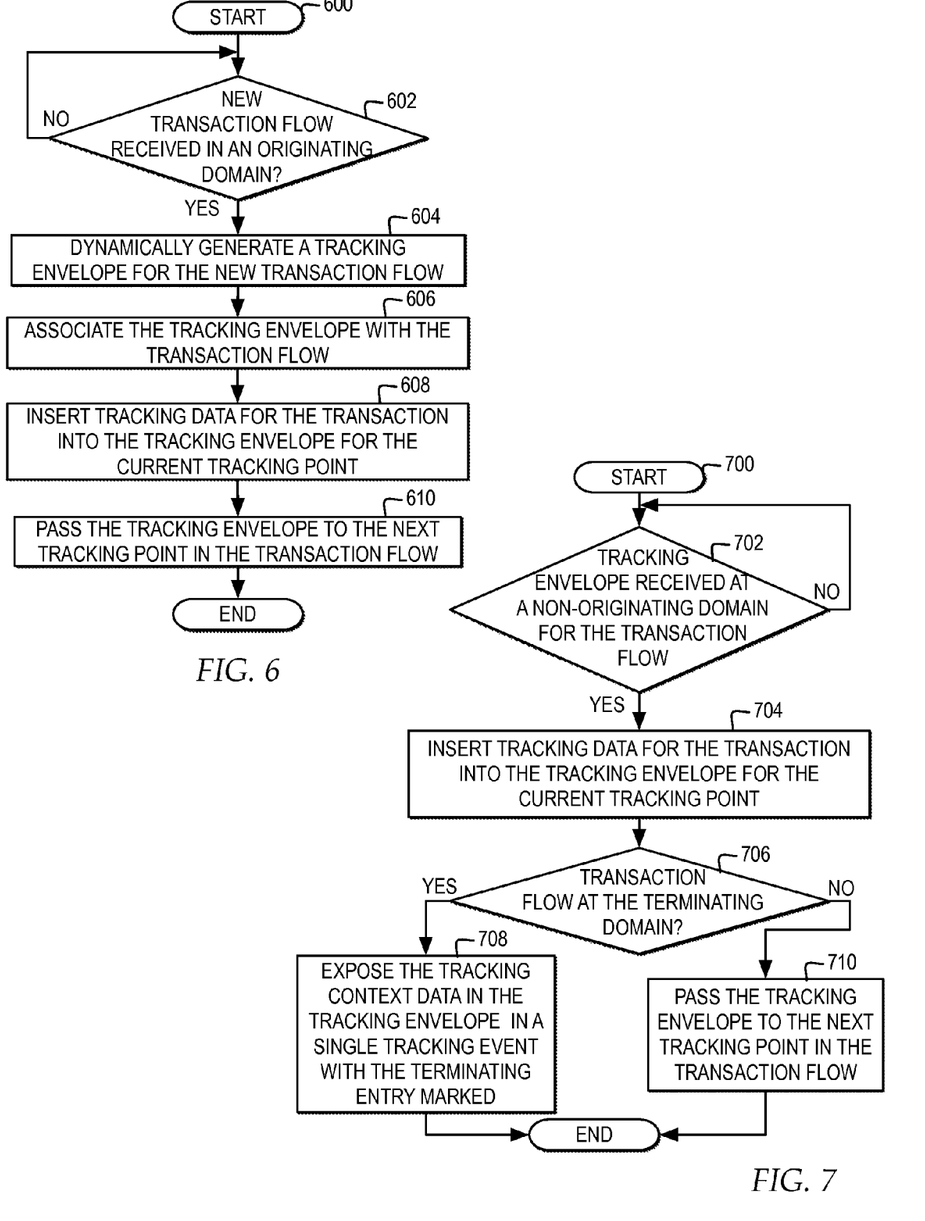
FIG. 6 illustrates a high level logic flowchart of a process and program for monitoring a transaction flow across a composite application at a domain in which the transaction flow originates.
FIG. 7 illustrates a high level logic flowchart of a process and program for monitoring a transaction flow across a composite application in a non-originating domain or terminating domain.

FIG. 6 illustrates a high level logic flowchart of a process and program for monitoring a transaction flow across a composite application at a domain in which the transaction flow originates. In the example, the process starts at block 600 and thereafter proceeds to block 602. Block 602 illustrates a tracking agent determining whether a tracking agent receives a new transaction flow in an originating domain. If the tracking agent receives a new transaction flow in an originating domain, then the process passes to block 604. Block 604 illustrates dynamically generating a tracking envelope for the new transaction flow. Next, block 606 illustrates associating the tracking envelope with the transaction flow. Thereafter, block 608 illustrates inserting tracking data for the transaction into the tracking envelope for the current tracking point. Next, block 610 illustrates passing the tracking envelope to the next tracking point in the transaction flow, and the process ends.

FIG. 7 illustrates a high level logic flowchart of a process and program for monitoring a transaction flow across a composite application in a non-originating domain or terminating domain. In the example, the process starts at block 700 and thereafter proceeds to block 702. Block 702 illustrates a tracking agent determining whether a tracking envelope is received at a non-originating domain for the transaction flow. If the tracking agent receives a tracking envelope at a non-originating domain for the transaction flow, then the process passes to block 704. Block 704 illustrates inserting tracking data for the transaction into the tracking envelope for the current tracking point. Next, block 706 illustrates a determination whether the tracking agent detects the transaction flow at the terminating domain. If the tracking agent detects the transaction flow at the termination domain, then the process passes to block 708. Block 708 illustrates exposing the tracking data in the tracking envelope in a single tracking event, with the terminating entry marked as the last entry in the transaction flow, and the process ends. Returning to block 706, if the tracking agent does not detect the transaction flow at the terminating domain, then the process passes to block 710. Block 710 illustrates passing the tracking envelope to the next tracking point in the transaction flow, and the process ends.

Figure 8:
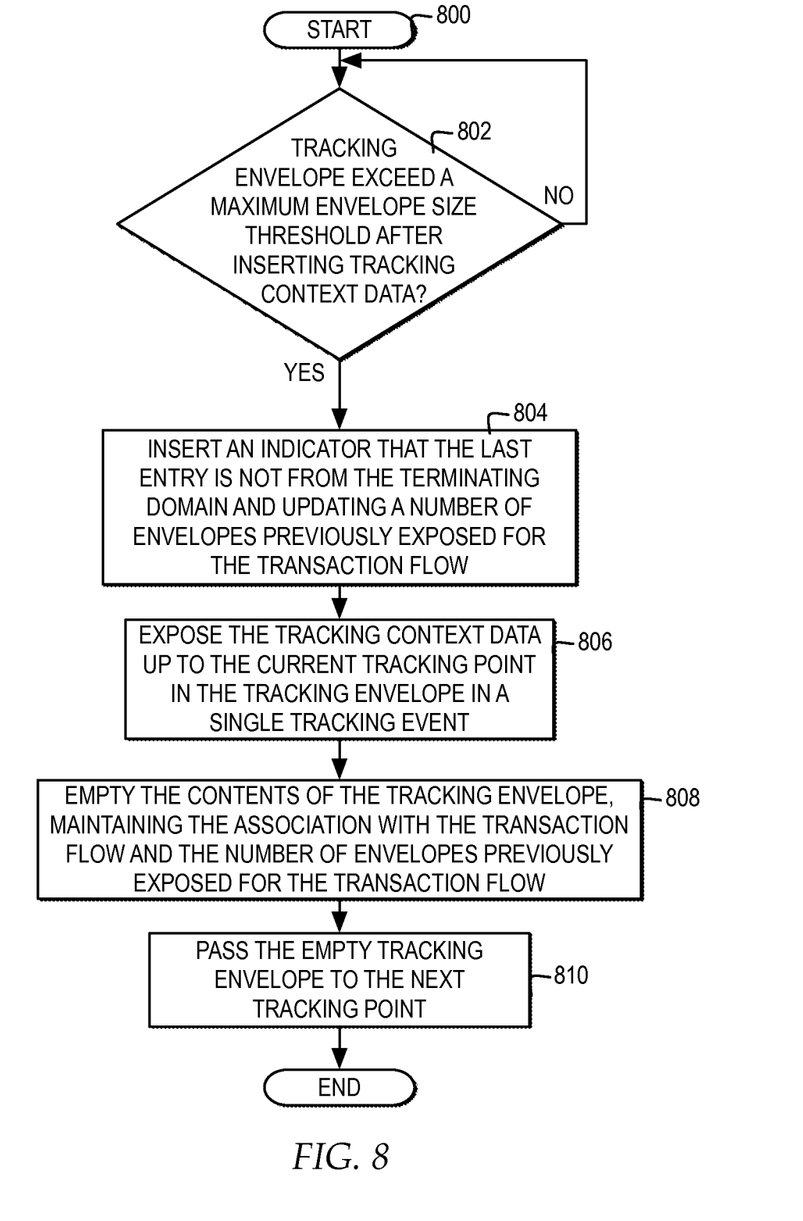
FIG. 8 illustrates a high level logic flowchart of a process and program for handling a single tracking envelope used to collect tracking data for a transaction flow across a composite application when the tracking envelope reaches a threshold size prior to the end of the transaction flow.

FIG. 8 illustrates a high level logic flowchart of a process and program for handling a single tracking envelope used to collect tracking data for a transaction flow across a composite application when the tracking envelope reaches a threshold size prior to the end of the transaction flow. In the example, the process starts at block 800 and thereafter proceeds to block 802. Block 802 illustrates a determination whether a tracking envelope exceeds a maximum envelope size threshold after inserting tracking context data. If the tracking envelope exceeds a maximum envelope size threshold, then the process passes to block 804. Block 804 illustrates a tracking agent inserting an indicator that the last entry is not from the terminating domain and updating a number of envelopes previously exposed for the transaction flow, if any. Next, block 806 illustrates exposing the tracking data up to the current tracking point in the tracking envelope in a single tracking event. Next, block 808 illustrates empting the contents of the tracking envelope, maintaining the association with the transaction flow and the number of envelopes previously exposed for the transaction flow. Thereafter, block 810 illustrates passing the empty tracking envelope to the next tracking point, and the process ends.

Figure 9:
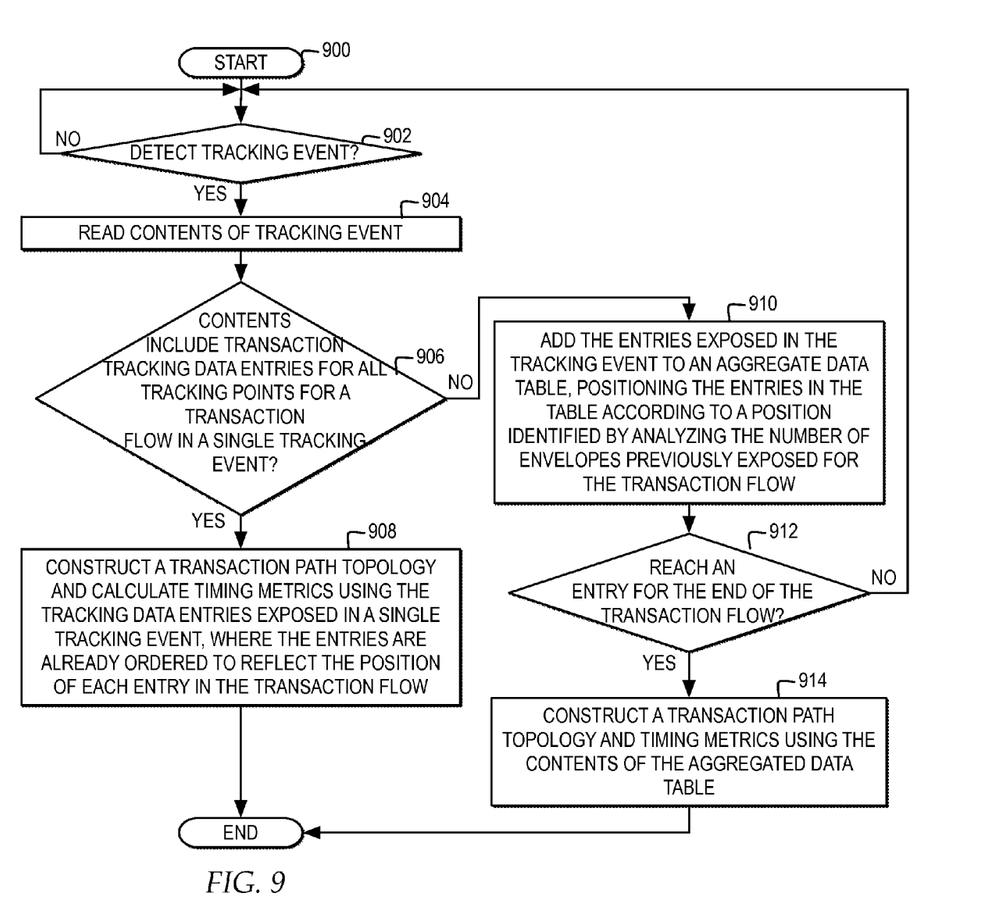
FIG. 9 illustrates a high level logic flowchart of a process and program for a transaction tracking controller handling tracking events exposing the tracking data entries in a tracking envelope passed along the transaction path of a transaction.

FIG. 9 illustrates a high level logic flowchart of a process and program for a transaction tracking controller handling tracking events exposing the tracking data entries in a tracking envelope passed along the transaction path of a transaction. In the example, the process starts at block 900 and thereafter proceeds to block 902. Block 902 illustrates a transaction tracking controller determining whether a tracking event is detected. If a transaction tracking controller determines that a tracking event is detected, then the process passes to block 904. Block 904 illustrates reading the contents of the tracking event. Next, block 906 illustrates a determination whether the contents include the tracking data entries for all tracking points for a transaction flow, in a single tracking event. In one example, the transaction tracking controller identifies a terminating entry marked in a tracking event or other flag set to indicate that only a single tracking event exposes the tracking data for all tracking points for a transaction flow. If the contents of the tracking event include tracking data entries for all tracking points for a transaction flow, in a single tracking event, then the process passes to block 908. Block 908 illustrates constructing a transaction path topology and calculating timing metrics for the path using the tracking data entries exposed in a single tracking event, where the entries are already ordered to reflect the position of each entry in the transaction flow, and the process ends.

Returning to block 906, if the contents of the tracking event do not include all the tracking data entries for a transaction flow in a single tracking event, then the process passes to block 910. Block 910 illustrates adding the entries exposed in the tracking event to an aggregate data table for the transaction flow, positioning the contents in the table according to a position identified by analyzing the number of envelopes previously exposed for the transaction flow. Next, block 912 illustrates a determination whether an entry for the end of the transaction flow is reached. If an entry for the end of the transaction flow is not reached, then the process returns to block 902. If an entry for the end of the transaction flow is reached, then the process passes to block 914. Block 914 illustrates constructing a transaction path topology and timing metrics using the contents of the aggregated data table, and the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method for tracking a transaction flow in a distributed environment, comprising:
    a computer inserting, at each intermediate transaction hop from among a plurality of transaction hops in a transaction flow through a composite application in a distributed environment, a separate entry with tracking data for a current transaction hop of the plurality of transaction hops into a tracking envelope associated with the transaction flow and passing the tracking envelope to a next transaction hop of the plurality of transaction hops in the transaction flow; and
    the computer inserting, at a final transaction hop of the plurality of transaction hops, a final entry with tracking data for the final transaction hop into the tracking envelope and exposing, in a single tracking event, a plurality of entries with tracking data for each of the plurality of transaction hops from the tracking envelope.

2. The method according to claim 1, further comprising:
    the computer dynamically generating, at a first transaction hop from among the plurality of transaction hops in the transaction flow, the tracking envelope and associating the tracking envelope with the transaction flow.

3. The method according to claim 1, further comprising:
    the computer configuring at least one tracking agent from among a plurality of tracking agents, at each transaction hop from among the plurality of transaction hops, to detect the tracking data for the transaction flow through one or more particular instances of a middleware stack from among a plurality of middleware stacks of the composite application, to monitor tracking data for the transaction flow and to pass the tracking envelope to the next transaction hop in the transaction flow.

4. The method according to claim 1, further comprising:
    the computer, detecting, at each transaction hop from among the plurality of transaction hops, the tracking data for the transaction hop comprising context data specifying a particular distributed component of a plurality of distributed components of a composite application run by the transaction flow and a time stamp for the transaction flow at each transaction hop.

5. The method according to claim 1, further comprising:
    the computer configuring each at least one tracking agent from among the plurality of tracking agents to monitor the transaction flow through at least one of the plurality of transaction hops in a separate domain from among a plurality of domains, wherein each separate domain comprises at least one middleware stack instance from among a plurality of middleware stack instances of the composite application across which the transaction flows.

6. The method according to claim 1, further comprising:
    the computer configuring a distributed environment to run the composite application, wherein the composite application comprises a plurality of distributed components running on a plurality of middleware stacks distributed across one or more operating system platforms across one or more server systems.

7. The method according to claim 1, further comprising:
    the computer passing, by a tracking agent configured to track the transaction flow through a first domain, the tracking envelope to a next tracking agent tracking the transaction flow through a next domain comprising the next transaction hop of the plurality of hops.

8. The method according to claim 1, further comprising
    the computer, inserting, at each transaction hop from among the plurality of transaction hops, the tracking data into the tracking envelope at each transaction hop in real-time concurrent with the transaction flow through the transaction hop.

9. The method according to claim 1, further comprising:
    the computer detecting the single tracking event;
    the computer reading the plurality of entries with tracking data from the tracking event, wherein the plurality of entries are ordered to reflect the order of each of the plurality of entries in the transaction flow;
    the computer analyzing the plurality of entries of tracking data to identify a topology of a path of the transaction flow through the composite application; and
    the computer analyzing the plurality of entries of context data to identify a performance time for the path of the transaction flow.

10. The method according to claim 1, further comprising:
    the computer inserting, at each intermediate transaction hop from among a plurality of transaction hops, the separate entry with tracking data for the current transaction hop of the plurality of transaction hops into the tracking envelope associated with the transaction flow and not exposing the tracking data through any tracking event independent from the tracking event at the final transaction hop exposing the plurality of entries of tracking data from the tracking envelope.

* * * * *